United States Patent
Luk et al.

(10) Patent No.: US 8,799,550 B2
(45) Date of Patent: Aug. 5, 2014

(54) SYSTEM AND METHOD FOR INCREASED EFFICIENCY PCI EXPRESS TRANSACTION

(75) Inventors: Betty Luk, San Francisco, CA (US); Gordon F. Caruk, Brampton (CA)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 946 days.

(21) Appl. No.: 12/837,636

(22) Filed: Jul. 16, 2010

(65) Prior Publication Data

US 2012/0017026 A1   Jan. 19, 2012

(51) Int. Cl.
G06F 13/36 (2006.01)
H04J 3/22 (2006.01)

(52) U.S. Cl.
USPC .......................... 710/314; 370/469

(58) Field of Classification Search
USPC .......................... 710/314; 370/469
See application file for complete search history.

(56) References Cited

U.S. PATENT DOCUMENTS

| | | | | |
|---|---|---|---|---|
| 6,032,197 A * | 2/2000 | Birdwell et al. | | 709/247 |
| 7,246,191 B2 * | 7/2007 | Stanton | | 710/310 |
| 7,702,827 B2 * | 4/2010 | Biran et al. | | 710/30 |
| 7,865,654 B2 * | 1/2011 | Pettey et al. | | 710/311 |
| 7,916,750 B2 * | 3/2011 | Das Sharma et al. | | 370/469 |
| 8,139,575 B2 * | 3/2012 | Biran et al. | | 370/389 |
| 8,166,227 B2 * | 4/2012 | Choi | | 710/313 |
| 8,209,364 B2 * | 6/2012 | Cheng | | 707/824 |
| 2007/0156928 A1 | 7/2007 | Raghunandan | | |
| 2009/0003335 A1 | 1/2009 | Biran et al. | | |
| 2009/0006711 A1 * | 1/2009 | Biran et al. | | 710/316 |
| 2011/0145469 A1 * | 6/2011 | Choi | | 710/314 |
| 2011/0320674 A1 * | 12/2011 | Gregg et al. | | 710/314 |
| 2012/0093048 A1 * | 4/2012 | Liu et al. | | 370/310.2 |

OTHER PUBLICATIONS

Pci-Sig: "PCI Express Base Specification XP055006831 Revision 1.0a", Apr. 15, 2003, pp. 1-76, XP0055006831.
International Search Report for PCT/US2011/044041, dated Feb. 7, 2012, 6 pages.
Written Opinion of the International Searching Authority for PCT/US2011/044041, dated Feb. 7, 2012, 6 pages.

* cited by examiner

Primary Examiner — Paul R Myers
Assistant Examiner — Christopher A Daley
(74) Attorney, Agent, or Firm — Sterne, Kessler, Goldstein & Fox P.L.L.C.

(57) ABSTRACT

A system and method using new PCI Express transaction layer packet headers so that unchanged header information within a burst of transactions does not need to be re-transmitted. After the first full packet header of a burst is sent, subsequent packet headers in the burst are smaller. Thus, more reduced headers can be transmitted over time with a resulting increased efficiency. Both sides of the PCI Express transaction must support this system and method for this approach to be enabled. Once enabled, both the PCI Express transmitter and receiver can use the regular full header PCI Express packets as well as the reduced header packets.

28 Claims, 13 Drawing Sheets

| Byte0[7:0] | Default Encoding |
|---|---|
| 11000000 | Memory read request reduced header |
| 11000001 | Memory read request 32-bit aligned reduced header |
| 11000010 | Memory write request reduced header |
| 11000011 | Memory write request 32-bit aligned reduced header |
| 11000100 | Completion reduced header |

| PCIE_REDUCED_HEADER_CNTL [R/W] | | | |
|---|---|---|---|
| Field Name | Bits | Default | Description |
| REDUCED_HEADER_CAPABILITY Access: R | 1:0 | 0x0 | Identifies the reduced header capability supported by this device. |
| REDUCED_HEADER_EN | 2 | 0x0 | Enable the generation and checking of reduced header encoding |
| CPL_REDUCED_HEADER_ENCODING | 10:3 | 0xC4 | Reduced header type encoding for completions |

FIG. 11A

| PCIE_REDUCED_HEADER_CNTL2 [R/W] | | | |
|---|---|---|---|
| Field Name | Bits | Default | Description |
| MEM_RD_REDUCED_HEADER_ENCODING | 7:0 | 0xC0 | Reduced header type encoding for memory reads |
| MEM_RD_32B_REDUCED_HEADER_ENCODING | 15:8 | 0xC1 | Reduced header type encoding for 32B aligned memory reads |
| MEM_WR_REDUCED_HEADER_ENCODING | 23:16 | 0xC2 | Reduced header type encoding for memory writes |
| MEM_WR_32B_REDUCED_HEADER_ENCODING | 31:24 | 0xC3 | Reduced header type encoding for 32B aligned memory writes |

FIG. 11B

| PCIE_REDUCED_HEADER_CNTL3 [R/W] | | | |
|---|---|---|---|
| Field Name | Bits | Default | Description |
| RID_BUS_NUMBER_0 | 7:0 | 0x0 | Requestor bus number corresponding to ID=00b. This field must be programmed (ie. There must be at least 1 requestor). |
| RID_BUS_NUMBER_1 | 15:8 | 0x0 | Requestor bus number corresponding to ID=01b. A value of 0 means that there is only 1 requestor in the topology). |
| RID_BUS_NUMBER_2 | 23:16 | 0x0 | Requestor bus number corresponding to ID=10b. A value of 0 means that there are only 2 requestors in the topology). |
| RID_BUS_NUMBER_3 | 31:24 | 0x0 | Requestor bus number corresponding to ID=11b. A value of 0 means that there are only 3 requestors in the topology). |

FIG. 12

SYSTEM AND METHOD FOR INCREASED EFFICIENCY PCI EXPRESS TRANSACTION

BACKGROUND

1. Field

The present invention relates generally to data communications, and in particular serial point-to-point data communications.

2. Background Art

The speed of computers has dramatically increased over recent years. A considerable portion of that increase has resulted from the increased CPU speeds. However, computer speed also depends upon the speed of data communications, i.e., the ability for CPUs to communicate data to and from peripheral devices. For some time, the peripheral component interconnect (PCI) bus provided adequate peripheral connectivity. However, with increased CPU speeds and greater data transfer demands, the PCI bus quickly became the slowest link between CPU and peripheral. In particular, the PCI bus imposed substantial pin, power and clocking disadvantages in order to meet the increased data transfer requirements.

In response to these disadvantages, the PCI Express industry standard developed. The PCI Express industry standard adopted a serial protocol that uses low voltage differential signals, does not impose the same clocking disadvantages, and delivers higher bandwidth with reduced pin count. PCI Express offers up to 32 data channels (known as lanes) that provide serial point-to-point connectivity between a "root" device and an "endpoint" device.

The PCI Express protocol is a layered protocol, with the layers including a transaction layer, a data link layer, and a physical layer. The fundamental building block of communication between PCI Express-compliant devices is the transaction layer packet (TLP). The TLP contains a header, a data payload and an error correction segment (called a digest). One or more TLPs create a transaction that enables an operation in a PCI Express-complaint device. For example TLP transactions facilitate memory read and write operations.

As noted above, the PCI Express protocol was developed to offer a flexible high speed approach to the modern data communication device-to-device challenges. Nevertheless, with the ever increasing demand for efficient data transfer to service high performance computer designs, the efficiency of data transfer remains a high priority. Thus, there is an ongoing need for enhancements to the PCI Express protocol. Any improvements to the PCI Express protocol must necessarily be backwards compatible with the standard PCI Express specifications.

Therefore, there is a need for a method and system to increase the efficiency of the standard PCI Express transactions while remaining compatible with the standard PCI Express specifications. In particular, since the PCI Express headers contribute to transfer inefficiency, there is a need to focus on PCI headers to reduce the inefficiency.

BRIEF SUMMARY OF EMBODIMENTS OF THE INVENTION

In an embodiment of the present invention, data packets are transmitted in a communications system using an approach in which packet headers can be reduced or compressed in size by not transmitting data field values that do not change from an initial data packet header. The reduced or compressed packet header contains the data field values that change from the initial data packet.

In a further embodiment of the present invention, the reduced header approach is applied in the PCI Express protocol-based scenario. Exemplary embodiments of reduced headers for memory read, memory write and completion transaction layer packets in a PCI Express scenario are described.

A software programming approach to register definition for PCI Express compliant devices to use the reduced header approach are also described.

Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 3 depicts a default encoding approach to reduced TLP headers, according to an embodiment of the present invention.

FIG. 8 depicts a diagram of a standard completion header for a transaction layer packet (TLP).

FIGS. 11A and 11B depict sample register definitions, according to an embodiment of the present invention.

FIG. 12 depicts requestor bus number encoding for scenarios in which there are up to four graphics processing units, according to an embodiment of the present invention.

Figure 1:
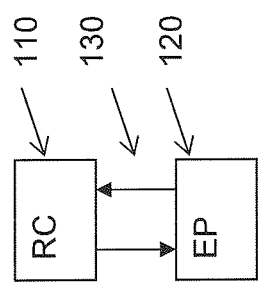
FIG. 1 depicts a data communications system using a PCI Express approach.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF EMBODIMENTS OF THE INVENTION

FIG. 1 depicts a data communications system that uses a PCI Express system for communication between devices 110 and 120. The basic unit of communication in the PCI Express standard is the transaction layer packet (TLP). One or more TLPs establish a PCI Express transaction and are transmitted over link 130 between devices 110 and 120. Devices 110 and 120 typically include a controller to control and manage the PCI Express transactions.

A generic TLP packet contains a header, a data payload and an error checking portion (also known as a digest). The data payload and the digest are optional, since not all TLP packets require a data payload or a digest. The TLP header is aligned as a double word (also known as a DWord), where a DWord equals four bytes or 32 bits. Depending on the particular PCI Express transaction, the TLP header can vary in length (i.e., 3 DWords or 4 DWords long).

Figure 2:
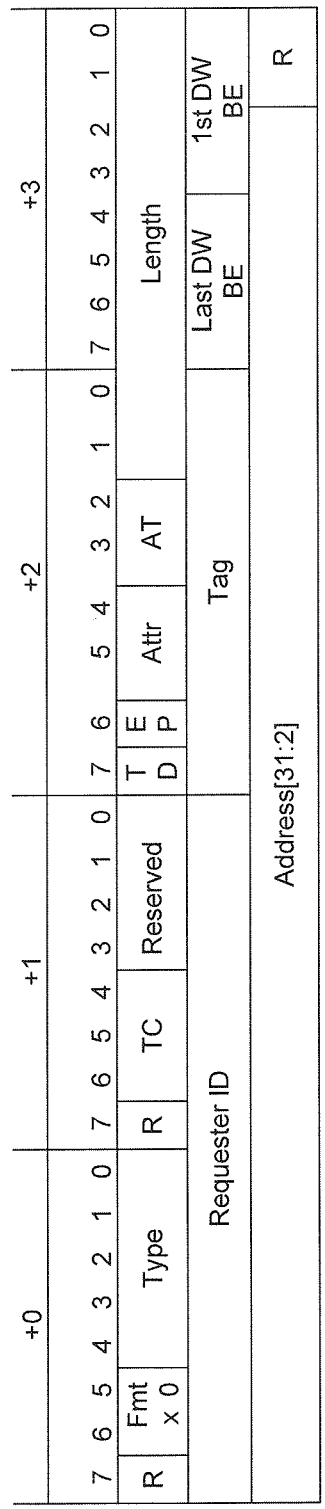
FIG. 2 depicts a diagram of a standard memory request transaction layer packet (TLP) header.

The first word of generic TLP header is shown in FIG. 2. In TLP header, the first field is a reserved field, is 1 bit long, and is marked "R" In common practice, this bit is coded with a zero and is ignored by PCI Express devices that receive this header. The second field indicates the format of the TLP, is 2 bits long, and is indicated by "Fmt." The four possibilities of values for this 2-bit value indicate the length of the header (either 3 DWords or 4 DWords) as well as whether a payload is present in the packet. Thus, a value of "00" indicates a 3 DWord header with no data payload, a value of "01" indicates a 4 DWord header with no data payload, a value of "10" indicates a 3 DWord header with a data payload, and finally a value of "11" indicates a 4 DWord header with a data payload. The third field indicates the type of TLP packet and occupies 5 bits. The table below summarizes the definition for various values of the type of TLP packet.

| Packet Type | Fmt | Description |
| --- | --- | --- |
| 00000 | 00, 01 | Memory read request (00 = 32 bit address and 01 = 64 bit address) |
| 00000 | 10, 11 | Memory write request (10 = 32 bit address and 11 = 64 bit address) |
| 01010 | 00 | Completion without data |
| 01010 | 10 | Completion with data |

The traffic class (TC) field is a three-bit field to identify up to eight different types of traffic classes. Such information can form the basis for the provision of different qualities of service. The TD field is a one-bit field that indicates the presence or otherwise of a digest at the end of the TLP packet. Thus, a TD field value of "1" indicates the presence of a digest, while a value of "0" indicates the absence of a digest. The EP field is a one-bit field that indicates whether a TLP packet is considered to contain "bad" data. Thus, an EP field value of "1" indicates that the data is bad, while a value of "0" indicates that the data is good. The "Attr" is a 2-bit field that provides attribute information for the TLP packet, where the attribute information includes information concerning data coherency and relaxed ordering.

The "Length" field is a 10-bit field that provides an indication of the length of the payload in the TLP. The payload length is expressed in DWords. Thus, a value of "1" indicates a payload length of 1 DWord in length. A maximum payload length of 1024 DWords can be accommodated and is indicated by a special Length field value of "0".

The second DWord of the TLP header contains a "Requester ID" field, a "Tag" field, a "Last DW BE" field and a "First DW BE" field. The "Requester ID" field is a 16-bit field that contains the bus number, the device number and the function number of the Requester. The contents of the "Requester ID" field are assigned during the configuration phase and are intended to uniquely identify the Requester in the PCI Express topology.

The "Tag" field is an 8-bit field that is used to uniquely identify a request. In particular, a Requester can create a unique "Tag" field for each of the requests made by the Requester that require a completion. Thus, an associated completion header contains the associated "Requester ID" and "Tag" values so that the Requester can rapidly identify the associated completion header.

The "First DW BE" field and the "Last DW BE" field are each 4-bit fields that indicate whether specific bytes in the first and last DWords are covered by a particular memory request TLP. Thus, the 4-bits in the "First DW BE" field indicate whether bytes 0, 1, 2 and 3 in the first DWord should be read from or written to by the memory request TLP. Similarly, the 4-bits in the "Last DW BE" field indicate whether bytes 0, 1, 2 and 3 in the last DWord should be read from or written to by the memory request TLP. A "0" value indicates that the indicated byte should not be read from or written to, while a "1" value indicates the indicated byte should be read from or written to.

Finally, the third DWord of the TLP header contains a 30-bit field that indicates the address of the location of the data that is being accessed.

Exemplary Memory Read and Write Reduced Packet Header Definitions

Embodiments of the present invention define a set of TLP headers for PCI Express packets that are smaller in size than those defined in the standard PCI Express specification, as described above. Such reduced headers increase the efficiency and throughput of the PCI Express link. These reduced TLP headers rely on the concept of a "same-as-before" TLP header. As the name suggests, "same-as-before" TLP headers do not transmit those fields that are unchanged from the previous header, as discussed further below.

The "same-as-before" approach can be used for all TLP header types, although certain TLP header types are well matched to this approach. Definitions are discussed below for three types of TLP headers, namely memory read, memory write, and completion. These three header types are particularly suited to the benefits of a reduced header approach since these types of TLPs are sent in groups such that only some fields in the headers are changed within the group. For example, during a run of 3DMark (a computer benchmarking tool), there can be numerous memory read requests with headers that are the same, with only some of the lower order address bits changing from one header to the next. In contrast, input/output and configuration type headers do not benefit as much from the reduced header concept since input/output and configuration type transactions are not as frequently used and hence do not offer the same opportunity to provide a significant performance benefit.

In embodiments of the present invention, the reduced headers are defined to economically fit within one DWORD, as illustrated in FIGS. 4-7. The type of reduced header can be encoded in "byte0" byte of the header field, using some of the reserved format and type codes. Various encoding schemes can be used to encode the header type. In addition, the encoding scheme can be programmable. In an exemplary illustration of the encoding scheme for the reduced headers, a default encoding scheme uses a Vendor Specific Header Format field in the TLP header. The Vendor Specific Header Format field provides for a three-bit field in byte0[7:5] being set to a value such as "110." FIG. 3 illustrates an exemplary default encoding of the types of reduced headers, using the Vendor Specific Header Format field. In particular, FIG. 3 illustrates an exemplary default encoding for the five reduced header types of (a) memory read request reduced header, (b) memory read request 32B aligned reduced header, (c) memory write request reduced header, (d) memory write request 32B reduced header, and (e) completion reduced header. As FIG. 3 illustrates, the first three bits of each of these reduced headers contain the value "110" to indicate the use of a vendor specific header format. In a reduced header, the following fields are absent, and the missing values are taken to be the same as that provided in the last received standard header of the same type. The absent fields in the reduced header are: Requestor ID, AT, Attr, EP, TD, TC, Last DW BE, 1st DW BE, together with the header bits not included in the particular reduced header definition.

Figure 4:
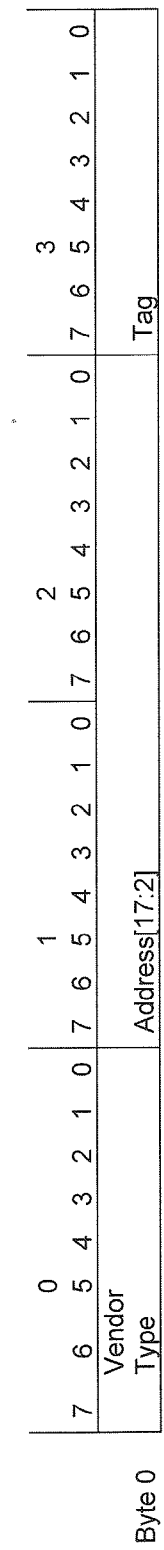
FIG. 4 depicts an exemplary memory read reduced header format for a memory read TLP packet, according to an embodiment of the present invention.

FIG. 4 illustrates a memory read reduced header format, in accordance with an embodiment of the present invention. As noted earlier, the reduced headers fit into a single DWORD. The fields for the memory read reduced header format include the header Type field (which can be the exemplary format as illustrated in FIG. 3), bits 17 through 2 of the Address field, and the Tag field. This memory read reduced header can be used when all of the other header bits are the same as the last memory read TLP using a standard memory read header. As noted above, the Requestor ID and other field values are not encoded in the reduced header since they are the same as that found in the previous memory read packet header.

Figure 5:
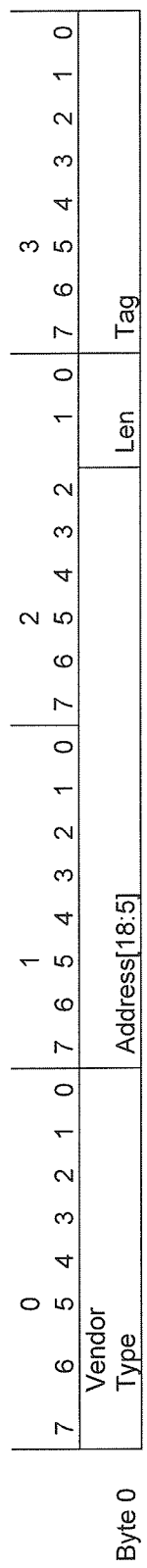
FIG. 5 depicts an exemplary 32-byte aligned memory read reduced header format for a memory read TLP packet, according to an embodiment of the present invention.

FIG. 5 illustrates a 32-byte aligned version of a memory read reduced header format, in accordance with an embodiment of the present invention. This 32-byte reduced header format is used for memory reads that are 32, 64, 128, or 256 byte in length. The fields for the memory read reduced header format include the header type field (which can be the exemplary format as illustrated in FIG. 3), bits 18 through 5 of the Address field, a two-bit Length field, and the Tag field. It is noted that the address bits [4:0] are always zero in a 32-byte aligned memory read, and therefore do not need to be transmitted. A new two-bit length field is introduced to describe the different type of 32-byte aligned memory read headers. Exemplary definitions for the two-bit length field are as follows: 00 for a 32 byte request, 01 for a 64 byte request, 10 for a 128 byte request and 11 for a 256 byte request.

Figure 6:
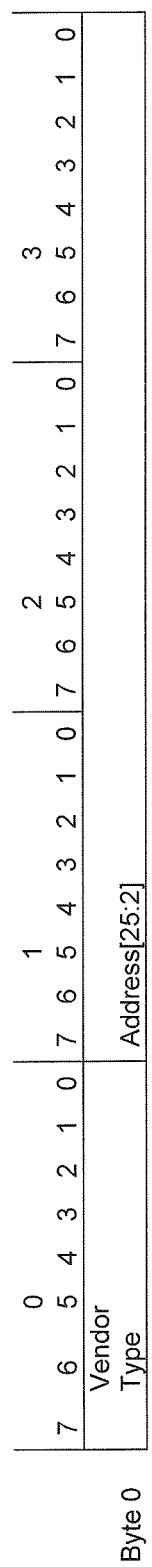
FIG. 6 depicts an exemplary memory write reduced header format for a memory write TLP packet, according to an embodiment of the present invention.

FIG. 6 illustrates a memory write reduced header format, in accordance with an embodiment of the present invention. The memory write reduced header format is similar to the memory read reduced header format illustrated in FIG. 4, except that the tag field is removed. The tag field can be treated as "same-as-before" since the tag field is not used. Further, the Last DW BE and the 1st DW BE are also the "same-as-before." The fields for the memory write reduced header format include the header type field (which can be as illustrated in FIG. 3) and bits 25 through 2 of the address field.

Figure 7:
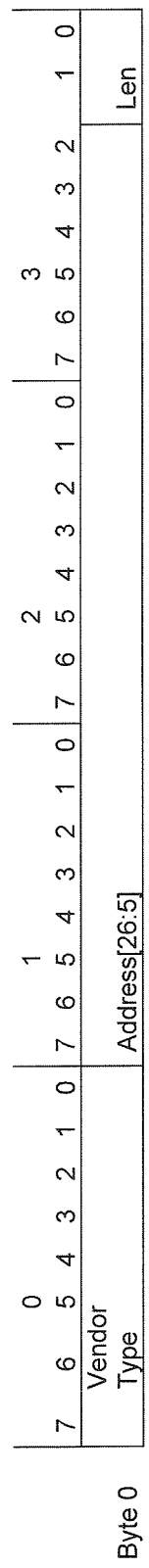
FIG. 7 depicts an exemplary 32-byte aligned memory write reduced header format for a memory write TLP packet, according to an embodiment of the present invention.

FIG. 7 illustrates a 32-byte aligned version of a memory write reduced header format, in accordance with an embodiment of the present invention. As expected, this reduced header format is used for memory writes that are 32, 64, 128, or 256 byte length only. As before, the 32-byte aligned addressed ensure that the last 5 bits of the address are always zero and therefore the address field captures address bits [26:5] after allowing for a 2-bit length field. As before, the two-bit Length field is defined as follows: 00 for a 32 byte request, 01 for a 64 byte request, 10 for a 128 byte request and 11 for a 256 byte request.

Exemplary TLP Completion Packet Header Definitions

Figure 8:
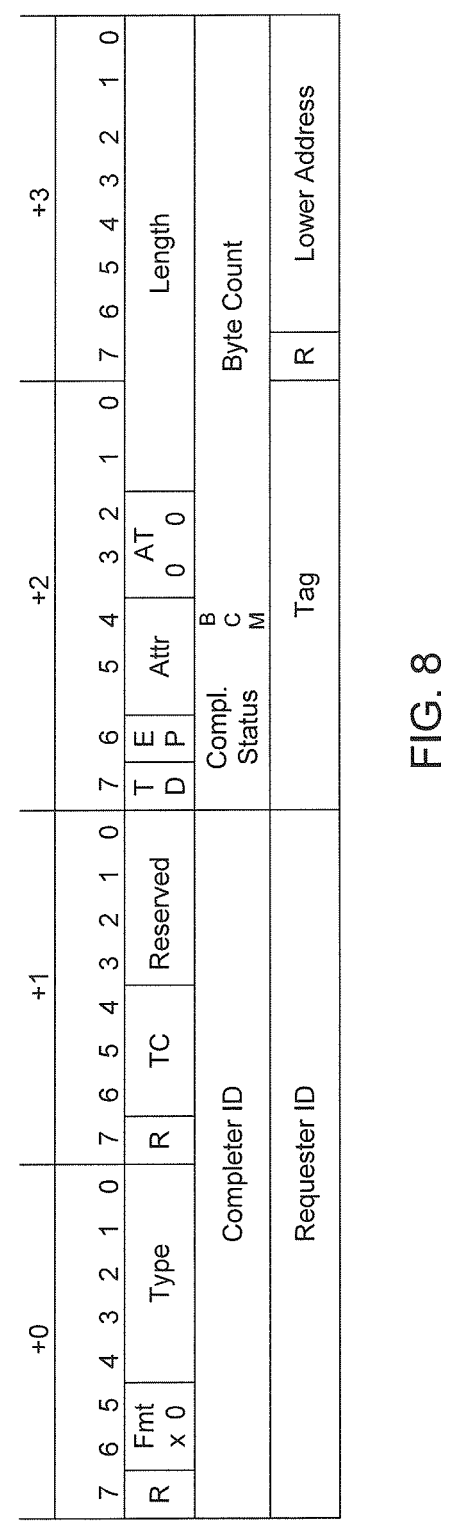

FIG. 8 illustrates the standard TLP completion header, as defined in the PCI Express specifications. The fields in the first DWord of the standard TLP completion header are identical to those fields in the first DWord of the standard TLP memory request header. The second DWord of the standard TLP completion header differs from the standard TLP memory request header, and includes a "Completer ID" field, a "Completion Status" field, a "Byte Count Modified" field and a "Byte Count" field. The "Completer ID" field is a 16-bit field that identifies the Completer Function in a similar manner to the approach used to identify the Requester Function. The "Completion Status" field is a 3-bit field that indicates whether the associated request has been successfully completed. Typical values for the "Completion Status" field are shown in the table below. The "Byte Count Modified" field is a 1-bit field that indicates that the "Byte Count" field has been modified and therefore is not being used in the convention manner. Finally, the "Byte Count" field is a 12-bit field that indicates the number of bytes remaining to complete the memory read request. Through the use of the value of the Byte Count field, the Requester device can determine whether any of the read completion TLP packets are unaccounted for. In fact, the "Byte Count" field is necessary in scenarios when a single memory read request results in more than one completion request, and therefore an accounting of the fields is necessary.

| Completion Status | Description |
| --- | --- |
| 000 | Successful completion |
| 001 | Unsuccessful completion |
| 010 | Configuration request retry status |
| 100 | Completer abort |

The third DWord of the standard TLP completion header includes a "Requestor ID" field, a "Tag" field, and a "Lower Address" field. The "Requestor ID" field is a 16-bit field that contains the "Requestor ID" value that initiated the request to which the completion is associated. Similarly, the "Tag" field is an 8-bit field that contains the "Tag" value associated with the request to which the completion applies. Finally, the "Lower Address" field is a 7-bit field that provides the byte address for the first byte of data returned with a memory read completion.

Following the same approach as noted above for the memory access reduced header formats, a reduced header format for a completion TLP packet can be achieved by removing the following fields from the header, with the values determined to be the same as the last standard header of the same type that was received. The removed fields from the reduced header are: Completer ID, Completion status, BCM (used only for PCI-X), TD, EP, and TC[2] (highest bit in the traffic class (TC) field). Note that the lower address and Byte Count have also been removed from the header, because they are typically not used in most scenarios. It should be noted that although the byte count field does vary, an examination of PCI Express traffic patterns reveals that there tends to be a group of completions that all use the same byte count. Thus, the opportunity for efficiency exists through the use of reduced headers.

Figure 9:
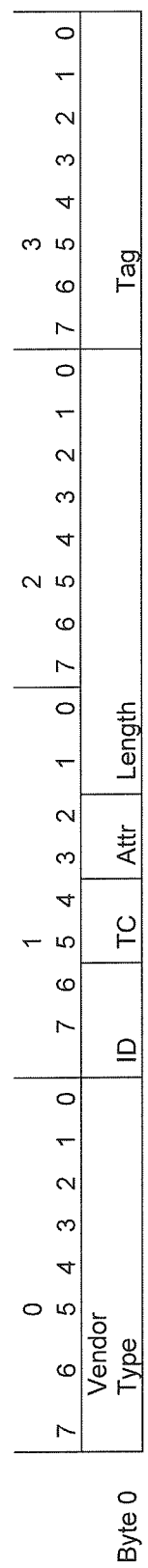
FIG. 9 depicts an exemplary reduced header format for a completion TLP packet, according to an embodiment of the present invention.
Figure 10:
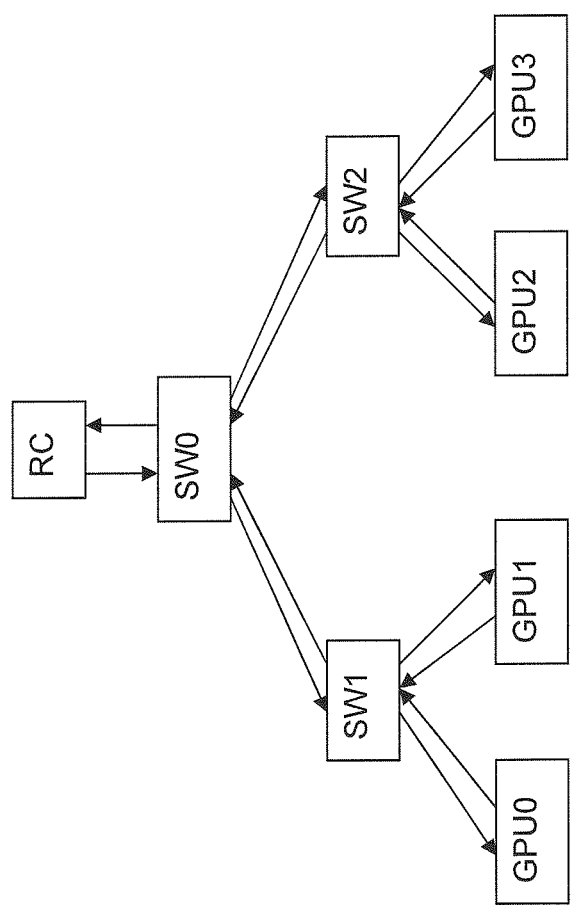
FIG. 10 depicts a PCI Express topology with four graphics processing unit end points, a root complex and three switches.

FIG. 9 illustrates the reduced completion header format, using the "same-as-before" approach, in accordance with an embodiment of the present invention. The fields for the completion reduced header format include the header Type field (which can be the default header type field discussed earlier), a new two-bit ID field, the two-bit TC field, the two-bit Attr field, the 10-bit Length field, and the 8-bit Tag field. The two-bit ID field is a new field that is defined to encode the requestor ID in the reduced completion header approach. By reducing the requestor ID to a two-bit ID field, the link efficiency between a switch and the root port or between two switches can be increased considerably. The two bits are used to distinguish four separate end points, e.g., four graphics processing units (GPUs) in a quad configuration, with each identified with a unique bus number, as shown in FIG. 10. FIG. 10 illustrates a PCI topology containing a root controller device (RC), 4 GPU end point devices, and three (3) intermediary switches. The encoding for the ID field is programmable, as discussed below. In the reduced header scenario, it is up to the software to determine the bus number for all the GPUs in the system and thereby program the appropriate device registers accordingly.

The above examples shown in FIGS. 4, 5, 6, 7 and 9, and the associated text, are illustrative of embodiments of the present invention, and are not to be considered limiting. Embodiments of the present invention also include more generally any lossless compression or reduced header approach wherein the packet header fields are divided into two groups. One group contains at least one header field whose value does not change from one packet ("first packet") to the next packet or "second packet" ("same-as-before" header field) and therefore does not need to be transmitted in the second packet. The other group contains the remaining header fields (i.e., those not included in the other group) and are therefore transmitted in both the first packet and second packet. Those transmitted packets with reduced headers (i.e., at least one header field is not transmitted) are identified by having a packet type whose definition matches the division of packet fields into the two groups discussed above.

In addition, the examples are not limiting in terms of the packets described. Embodiments of the present invention include packets used in a personal computer application environment, transaction layer packets and packets whose format is standardized by PCI Special Interest Group (PCI-SIG).

Finally, the examples are not limiting in terms of the number of reduced (compressed) header format types that can be transmitted substantially at the same time (where "substantially at the same time" includes multiple parallel packet stream sessions that are active at any given time). Embodiments of the present invention include two or more packet streams that are transmitted substantially at the same time, wherein each packet stream is a different reduced packet type (e.g., multiple memory read, multiple memory write, memory read and memory write, etc.). In such an embodiment, header type definitions and register definitions are expanded to include multiple packet streams originating from one or more sources. Such header type definitions again use the Vendor Specific Header Format field to identify each header type, and thereby permit discovery of the separate packet streams. Where appropriate, the reduced header format can be adjusted to permit sufficient bits to facilitate a complete definition of the number of separate packet streams by using otherwise unused bits.

Software Definition of Registers

In order to implement the reduced headers, registers at both ends of the communication link need to be provided definitions that comport with the particular reduced header embodiment deployed. Therefore register definitions are required that include provision of the following information: (a) enablement of reduced header encoding, and (b) the reduced header type encodings for memory reads, memory writes and completions. In addition, register definitions are also necessary to support 32-byte aligned embodiments of memory reads and 32-byte aligned embodiments of memory writes. Further, since different versions of reduced header implementation are contemplated over time, a further register field can be defined so that software can readily identify which generation of reduced header is supported by a particular device. A register field that indicates the particular generation supported can be set as a "read only" field, and therefore not configurable by external software programming.

Exemplary register definitions in accordance with the above reduced header approach are shown in FIGS. 11A and 11B. FIG. 11A illustrates an embodiment of the definition that includes three fields, namely: (a) a two-bit field that defines the reduced header capability, (b) a one-bit enablement field, and (c) an eight-bit field that defines the reduced header encoding for completions. With respect to the one-bit enablement field, it should be noted that even when the reduced header mechanism is enabled, "regular" packets (i.e., those packets using the full standard PCI Express header) can still be sent and received. In fact, when a header field value changes (i.e., the value is no longer the "same as before"), the full standard PCI Express header is used. When such a standard PCI Express header is encountered, it is processed in the normal manner.

FIG. 11B illustrates an embodiment of the definition of four fields associated with the reduced memory read and reduced memory write headers. The first 8-bit field defines the memory read reduced header encoding being used. The second 8-bit field defines the 32-byte aligned version of memory read reduced header encoding being used. The third 8-bit field defines the reduced memory write reduced header encoding being used. The final 8-bit field defines the 32-byte aligned version of memory write reduced header encoding being used.

Registration of Multiple PCI Express End Points

In embodiments with multiple PCI Express end points, additional differentiation is required with respect to each of the end points. As noted earlier, FIG. 10 illustrates a topology with 4 graphics processing unit (GPU) end point devices. The use of a GPU end point device is illustrative of an end point device and not limiting in terms of embodiments of the present invention. Also shown is a root controller device (RC). In this topology, there are therefore 4 end point devices that can originate memory reads (both to system memory accessed by the RC and peer-to-peer (from one GPU to another)). Accordingly, there is a need for differentiation in terms of four unique requestor bus numbers. In this example, it is assumed that there is only one function within each graphics processing unit that requests data at any one time, and therefore there is no need to differentiate between different functions emanating from a single graphics processing unit.

Based on the need for four unique requestor bus numbers, FIG. 12 illustrates an exemplary set of register definitions that support this particular need. FIG. 12 illustrates an embodiment of the definition of four fields associated with the requestor bus numbers. The first 8-bit field defines the requester bus number corresponding to an ID of 0. This first field must be programmed, since there must exist at least one requestor. The second 8-bit field defines the requester bus number corresponding to an ID of 1. A value of 0 for the second 8-bit field indicates that there is only one requester in the topology. The third 8-bit field defines the requester bus number corresponding to an ID of 2. A value of 0 for the third 8-bit field indicates that there are only two requestors in the topology. The fourth 8-bit field defines the requester bus number corresponding to an ID of 3. A value of 0 for the fourth 8-bit field indicates that there are only three requestors in the topology. In an alternate embodiment, a 16-bit field can be used to define bus/device/function combination for the multiple requestors in the PCI Express topology.

Method of Using Reduced Header Approach

Figure 13:
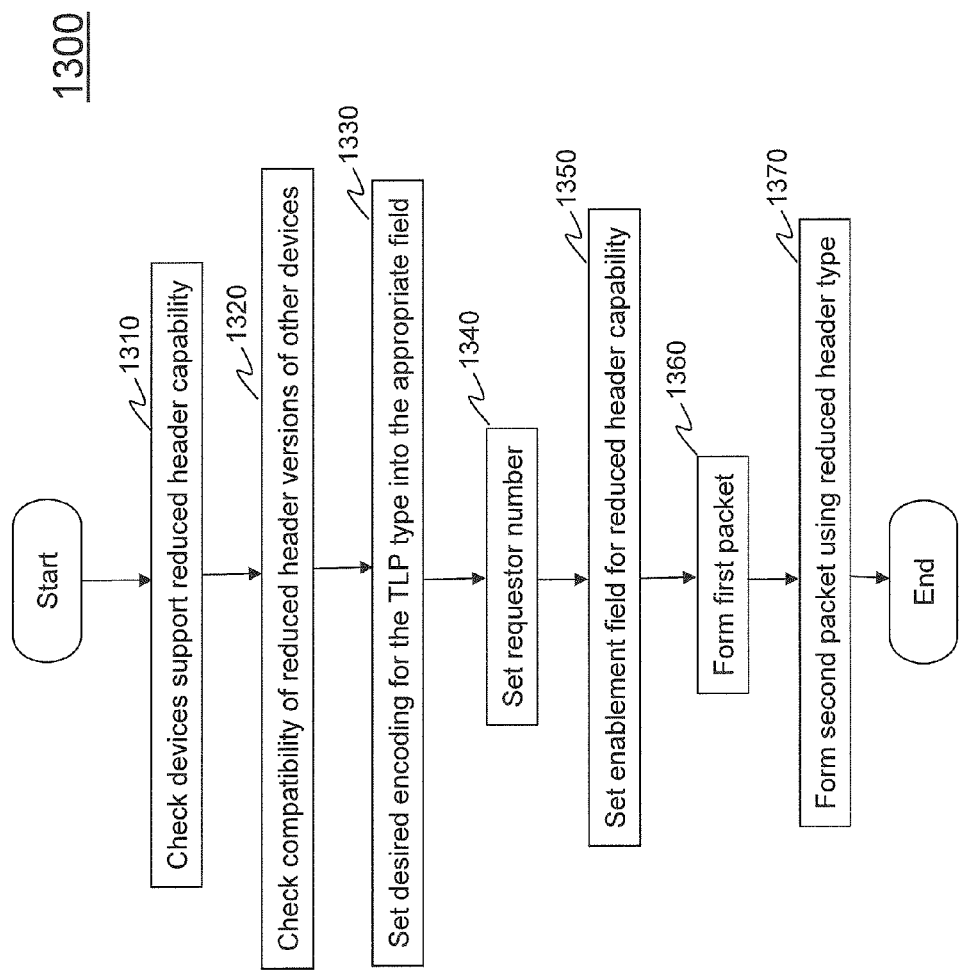
FIG. 13 depicts a flowchart of an exemplary method of using a reduced header, according to an embodiment of the invention.

FIG. 13 depicts a flowchart 1300 of an exemplary method for the use of a PCI Express reduced header, according to embodiments of the present invention. FIG. 13 is described with continued reference to the operating environment of FIG. 1. However, method 1300 is not limited to that embodiment. Method 1300 begins at step 1310.

In step 1310, devices 110 and 120 can check that the other device supports the reduced header capability. In one embodiment of the present invention, the check can be performed by checking the vendor and device ID fields in the associated register to determine the existence and identity of the destination device. Next, a table that is populated at the time the driver is built can be checked to determine if the destination device is in the list of known compatible devices. In an alternate embodiment, a check can be made in a status register in a known location to obtain confirmation that the destination device is compatible. In a still further embodiment, this feature can be implemented by checking that the other device supports the reduced header capability through a trial and error approach.

In step 1320, devices 110 and 120 can check that the reduced header capability versions supported by each device are compatible with each other. In one embodiment of the present invention, the check can be performed by checking the following field in the associated registers on both devices: PCIE_REDUCED_HEADER_CNTL_REDUCED_HEADER_CAPABILITY.

In step 1330, the desired encoding for the TLP type is set in the appropriate field, namely:
(a) CPL_REDUCED_HEADER_ENCODING;
(b) MEM_RD_REDUCED_HEADER_ENCODING;
(c) MEM_RD_32B_REDUCED_HEADER_ENCODING;
(d) MEM_WR_REDUCED_HEADER_ENCODING; and
(e) MEM_WR_32B_REDUCED_HEADER_ENCODING.
It should be noted that the encoding that is used must be the same for all devices within the topology that using the reduced header mechanism.

In step 1340, the requestor number is set. In an environment such as that displayed in FIG. 1, there is only one end point device (GPU in this case), and thus the value of PCIE_REDUCED_HEADER_CNTL3.RID_BUS_NUMBER_0 to the bus number of the end point device.

In step 1350, the reduced header capability of both devices is enabled by setting the following field value to 1: PCIE_REDUCED_HEADER_CNTL.REDUCED_HEADER_EN.

In step 1360, the source device (e.g., device 110) forms a first packet for transmission to the second device (e.g., device 120).

In step 1370, the source device forms a second packet wherein at least one header field that would have been transmitted is absent as it is the same as the first packet.

The above method can be readily extended to more complex topologies that involve multiple end point devices, as shown for example in FIG. 10. The intended usage model, though not required, is that all PCI Express links in the more complex topology supports the reduced header mechanism. In this topology, software programs all devices involved. For example, the root controller, all switches and graphics processor units in FIG. 10 would support the reduced header mechanism. Thus, two devices in the simple topology of FIG. 1 support the reduced header mechanism, while eight devices in the simple topology of FIG. 10 support the reduced header mechanism. In this more complex technology, step 1340 becomes more complex to support the four graphic processor units. Here, software programs the following four fields with the bus numbers of the four graphic processor units: PCIE_REDUCED_HEADER_CNTL3.RID_BUS_NUMBER_0 through 3.

Persons of ordinary skill in the relevant art(s) will recognize that the scope of the embodiments of the present invention is not limited to the specific exemplary encodings provided in this description. In particular, embodiments of the present invention can be used with alternate encodings and compression schemes that implement a reduced header approach in a PCI Express topology. Further, embodiments of the present invention can be used with versions, including future versions, of the PCI Express standard. In addition, embodiments of the present invention are also application to other data transaction standards, both present and future.

The invention can work with software, hardware, and operating system implementations other than those described herein. Any software, hardware, and operating system implementations suitable for performing the functions described herein can be used.

In the event the PCI-SIG adopted reduced header formats, the format and type encodings for the request types will become defined and can be fixed. In such a situation, the programmability provided by registers will provide no value and can therefore be eliminated in favor of the hardwired values defined in the PCI-SIG defined values.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A method for transmitting a packet stream from a source to a destination, comprising:
   forming a first packet having a first packet type and a first header field; and forming a second packet having a second packet type, wherein the second packet type is a reduced header type associated with the first packet type, and a second header field is not included in the second packet when the second header field is of the same type as and of equal value to the first header field, wherein the second packet includes in its reduced header one of: a 16-bit address field associated with a memory read transaction, a 14-bit address field together with a 2-bit indication of power-of-2 byte memory alignment, a 24-bit address field associated with a memory write transaction, or a 22-bit address field together with a 2-bit indication of power-of-2 byte memory alignment.

2. The method according to claim 1, wherein said first and second packets are a PCI Express packet and a modified PCI Express packet respectively.

3. The method according to claim 2, wherein a header length of the second packet is less that a header length of the first packet.

4. The method according to claim 1, wherein the first packet type comprises one of a memory read packet type, a memory write packet type and a completion packet type, and the second packet type comprises one of a reduced memory read packet type, a reduced memory write packet type and a reduced completion packet type respectively.

5. The method according to claim 1, wherein the first packet type is one of a memory read packet type and a memory write packet type, and the first and second header fields comprise at least one of Requester ID, AT, Attr, EP, TD, TC, Last DW BE, 1st DW BE and a portion of an address field.

6. The method according to claim 1, wherein the first packet type is one of a memory read packet type and a memory write packet type, and the first and second header fields each comprise a plurality of fields, wherein the plurality of fields comprises Requester ID, AT, Attr, EP, TD, TC, Last DW BE, 1st DW BE and a portion of an address field.

7. The method according to claim 1, wherein a header of the second packet is one DWord in length.

8. The method according to claim 1, wherein a header length of the second packet is less that a header length of the first packet.

9. The method according to claim 1, wherein the second packet type is a reduced header type associated with a power-of-2-byte aligned memory read packet.

10. The method according to claim 1, wherein the second packet type is a reduced header type associated with a power-of-2-byte aligned memory write packet.

11. The method according to claim 1, wherein the first packet type is a completion packet type, and the first and second header fields comprise one of Completer ID, Completion Status, BCM, Byte Count, TD, EP and TC[2].

12. The method according to claim 11, wherein the second packet includes a new ID field value to distinguish between two or more destinations.

13. A method for receiving a packet stream at a destination from a source, comprising:
receiving from the packet stream a first packet of a first packet type, wherein the first data packet comprises a first header field;
receiving from the packet stream a second packet having a second packet type, wherein the second packet type is a reduced packet header type associated with the first packet type; and
using the second packet, wherein the using includes deeming the second packet includes a second header field of the same type as and of equal value to the first header field, wherein the second packet includes in its reduced header one of: a 16-bit address field associated with a memory read transaction, a 14-bit address field together with a 2-bit indication of power-of-2 byte memory alignment, a 24-bit address field associated with a memory write transaction, or a 22-bit address field together with a 2-bit indication of power-of-2 byte memory alignment.

14. The method according to claim 13, wherein said first and second packets are a PCI Express packet and a modified PCI Express packet respectively.

15. The method according to claim 14, wherein a header length of the second packet is less that a header length of the first packet.

16. The method according to claim 13, wherein the first packet type comprises one of a memory read packet type, a memory write packet type and a completion packet type, and the second packet type comprises one of a reduced memory read packet type, a reduced memory write packet type and a reduced completion packet type respectively.

17. The method according to claim 13, wherein the first packet type is one of a memory read packet type and a memory write packet type, and the first and second header fields comprise one of Requester ID, AT, Attr, EP, TD, TC, Last DW BE, 1st DW BE and a portion of an address field.

18. The method according to claim 13, wherein the first packet type is one of a memory read packet type and a memory write packet type, and the first and second header fields each comprise a plurality of fields, wherein the plurality of fields comprises Requester ID, AT, Attr, EP, TD, TC, Last DW BE, 1st DW BE and a portion of an address field.

19. The method according to claim 13, wherein a header of the second packet is one DWord in length.

20. The method according to claim 13, wherein a header length of the second packet is less that a header length of the first packet.

21. The method according to claim 13, wherein the second packet type is a reduced header type associated with a power-of-2-byte aligned memory read packet.

22. The method according to claim 13, wherein the second packet type is a reduced header type associated with a power-of-2-byte aligned memory write packet.

23. The method according to claim 13, wherein the first packet type is a completion packet type, and the first and second header fields comprise one of Completer ID, Completion Status, BCM, Byte Count, TD, EP and TC[2].

24. The method according to claim 23, wherein the second packet includes a new ID field value to distinguish between two or more destinations.

25. A method for establishing a packet transmission link from a source to a destination, comprising:
verifying that a destination device supports a reduced header capability; wherein the second packet includes in its reduced header one of: a 16-bit address field associated with a memory read transaction, a 14-bit address field together with a 2-bit indication of power-of-2 byte memory alignment, a 24-bit address field associated with a memory write transaction, or a 22-bit address field together with a 2-bit indication of power-of-2 byte memory alignment and
verifying that a source device and the destination device support compatible reduced header capabilities.

26. The method according to claim 25, further comprising:
setting a requestor number; and
setting a value in a field in a register in each of the source and destination devices to indicate a reduced header based link is established.

27. A method for transmitting a packet stream from a source to a destination, comprising:
forming a first packet having a first packet type and a first header field; and
forming a second packet having a second packet type, wherein the second packet type is a compressed packet type that omits data that is redundant with the first packet,
wherein the first packet and second packet conform to a component interconnect format for use in a computing platform,
wherein the second packet includes in its reduced header one of: a 16-bit address field associated with a memory read transaction, a 14-bit address field together with a 2-bit indication of power-of-2 byte memory alignment, a 24-bit address field associated with a memory write transaction, or a 22-bit address field together with a 2-bit indication of power-of-2 byte memory alignment.

28. The method according to claim 27, wherein the first packet and the second packet conform to a format which is standardized by PCI Special Interest Group (PCI-SIG).

* * * * *